US010933814B2

(12) United States Patent
Erhardt et al.

(10) Patent No.: US 10,933,814 B2
(45) Date of Patent: Mar. 2, 2021

(54) DISPLAY POSITION FOR CAB WITH OVERHEAD DOOR

(71) Applicant: Clark Equipment Company, West Fargo, ND (US)

(72) Inventors: Cody Erhardt, Bismarck, ND (US); Jonathan J. Roehrl, Bismarck, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 0 days.

(21) Appl. No.: 16/516,366

(22) Filed: Jul. 19, 2019

(65) Prior Publication Data
US 2020/0023789 A1 Jan. 23, 2020

Related U.S. Application Data

(60) Provisional application No. 62/700,539, filed on Jul. 19, 2018.

(51) Int. Cl.
*B60R 11/04* (2006.01)
*B60R 11/02* (2006.01)
*B60R 11/00* (2006.01)

(52) U.S. Cl.
CPC ....... *B60R 11/0235* (2013.01); *B60R 11/04* (2013.01); *B60R 2011/0022* (2013.01); *B60Y 2200/415* (2013.01)

(58) Field of Classification Search
None
See application file for complete search history.

(56) References Cited

U.S. PATENT DOCUMENTS

| 5,362,118 | A  | 11/1994 | Houriez |
| 5,567,004 | A  | 10/1996 | Pietzsch |
| 5,673,963 | A  | 10/1997 | Pietzsch |
| 6,039,141 | A  | 3/2000  | Denny |
| 7,032,703 | B2 | 4/2006  | Wulfert et al. |
| 7,484,587 | B2 | 2/2009  | Portscheller et al. |
| 8,016,345 | B1 | 9/2011  | Goddard et al. |
| 8,610,747 | B2 | 12/2013 | Kuwae et al. |
| 8,684,120 | B2 | 4/2014  | Suneya et al. |
| 9,056,587 | B2 | 6/2015  | Montgomery et al. |
| 9,109,348 | B2 | 8/2015  | Saitou et al. |

(Continued)

FOREIGN PATENT DOCUMENTS

| DE | 4404415 A1      | 8/1995 |
| DE | 112013006454 T5 | 9/2015 |

OTHER PUBLICATIONS

International Search Report and Written Opinion dated Nov. 5, 2019 for International Application No. PCT/US2019/042510 filed Jul. 19, 2019, 13 pages.

*Primary Examiner* — Tyler W. Sullivan
(74) *Attorney, Agent, or Firm* — John Veldhuis-Kroeze; Westman, Champlin & Koehler, P.A.

(57) ABSTRACT

Disclosed are front entry cabs, and power machines with front entry cabs, having a door that is moveable between opened and closed positions and a display oriented in the cab to provide information to the operator both while the door is in the opened and closed positions. In the opened position, the door is positioned within an operator compartment of the cab above the operator seat and below a top of the cab. The display is positioned to not interfere with the door, door linkages, or operator joystick control.

10 Claims, 16 Drawing Sheets

(56) References Cited

U.S. PATENT DOCUMENTS

| | | |
|---|---|---|
| 9,193,375 B2 | 11/2015 | Schramm et al. |
| 9,262,061 B2 | 2/2016 | Miyamoto |
| 9,322,147 B2 | 4/2016 | Date |
| 9,333,927 B2 | 5/2016 | Mori |
| 9,518,375 B2 | 12/2016 | Uchida et al. |
| 9,702,112 B2 * | 7/2017 | Shioji ............... B60R 11/0235 |
| 9,764,642 B2 | 9/2017 | Anderton et al. |
| 9,783,056 B2 | 10/2017 | Klein et al. |
| 9,809,266 B1 | 11/2017 | James et al. |
| 9,810,131 B2 | 11/2017 | Iwata et al. |
| 9,820,393 B2 | 11/2017 | Saitou et al. |
| 9,870,654 B2 | 1/2018 | Tanabe et al. |
| 2005/0027420 A1 * | 2/2005 | Fujishima ............. E02F 9/2045 |
| | | 701/50 |
| 2011/0233963 A1 | 9/2011 | Yamashita et al. |
| 2013/0035824 A1 | 2/2013 | Nakamura et al. |
| 2014/0031954 A1 | 1/2014 | Gerhardy et al. |
| 2014/0053092 A1 * | 2/2014 | Grevinga ............. A01D 41/127 |
| | | 715/769 |
| 2014/0170617 A1 | 6/2014 | Johnson et al. |
| 2014/0277614 A1 | 9/2014 | Larimer |
| 2015/0246613 A1 * | 9/2015 | Shimazu ............... G07C 5/0808 |
| | | 701/102 |
| 2015/0330281 A1 * | 11/2015 | Ashitaka ................. F01P 7/04 |
| | | 123/41.12 |
| 2016/0101784 A1 * | 4/2016 | Olson .................... B60K 35/00 |
| | | 340/576 |
| 2016/0224227 A1 * | 8/2016 | Brush .................... B60K 35/00 |
| 2016/0265196 A1 | 9/2016 | Shimizu |
| 2017/0030054 A1 | 2/2017 | Okumura et al. |
| 2017/0050562 A1 * | 2/2017 | Jinno ....................... F02M 5/00 |
| 2017/0086340 A1 | 3/2017 | Murai et al. |
| 2017/0090741 A1 | 3/2017 | Tentinger et al. |
| 2017/0107693 A1 | 4/2017 | Yamada |
| 2017/0235296 A1 * | 8/2017 | Holzkamper ......... G06F 3/0346 |
| | | 700/83 |
| 2017/0260890 A1 | 9/2017 | Uehara et al. |
| 2017/0284069 A1 | 10/2017 | Machida et al. |
| 2018/0011551 A1 * | 1/2018 | Gothlin .................. B60K 37/04 |
| 2018/0162413 A1 * | 6/2018 | Theodosiou ............ E02F 9/163 |
| 2019/0048559 A1 * | 2/2019 | Olsen ......................... E02F 3/32 |
| 2019/0135091 A1 * | 5/2019 | Erhardt ..................... B60J 10/84 |
| 2019/0209500 A1 * | 7/2019 | Kulkarni ................. A61P 17/04 |
| 2020/0164811 A1 * | 5/2020 | Carter .................... B60K 37/06 |
| 2020/0371244 A1 * | 11/2020 | Murakami ............ G01S 17/894 |

\* cited by examiner

DISPLAY POSITION FOR CAB WITH OVERHEAD DOOR

CROSS-REFERENCE TO RELATED APPLICATION

This application claims the benefit of U.S. Provisional Application No. 62/700,539, which was filed on Jul. 19, 2018.

BACKGROUND

The present disclosure is directed toward power machines. More particularly, the present disclosure is related to doors on and display panels in cabs of power machines.

Power machines, for the purposes of this disclosure, include any type of machine that generates power for accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Many power machines have operator compartments defined, at least in part, by a cab in which an operator can sit while operating the power machine. Some of these cabs have doors that can be opened to allow access into and out of the cab and can be closed to provide protection from the elements and the like when an operator is located within the cab. Some loaders with front door entry have lift arms, at least parts of which move in front of the cab such that the door must be closed while operating the power machine otherwise the door, in the open position, will interfere with the travel path of the lift arm or more particularly, a cross-member that is coupled to lift arms located on each side of the power machine. A solution to this interference problem between the door and the lift arm can include a door that opens upwardly and sits above the operator's head when operated. Inside the cab are various operator controls and instrumentation, including a display. Having such a door could interfere with the display inside of the cab.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Disclosed are front entry cabs, and power machines with front entry cabs, having a door that is moveable between opened and closed positions and a display oriented in the cab to provide information to the operator both while the door is in the opened and closed positions. In the opened position, the door is positioned within an operator compartment of the cab above the operator seat and below a top of the cab. The display is positioned to not interfere with the door, door linkages, or operator joystick control.

In some exemplary embodiments, a cab (250; 350; 450; 550; 650) for a power machine (100; 200) includes a cab frame (210; 310) forming an operator compartment and having a first side wall (312), a second sidewall (314), a front (316), a rear (318), a top (320) and a bottom (323). An operator seat (364; 464; 564) is positioned within the cab. A cab door (324; 424; 524; 624) is configured to cover an opening (326) in the front of the cab frame when in a closed position and to be moved between the closed position and an open position overhead of the operator seat. A display (302; 402) is mounted to a pillar (382) of the cab frame in a corner between the front and one of the first and second sidewalls at a position interior to the cab which provides visual access to the display by an operator positioned on the operator seat with the cab door in the closed position, the open position overhead of the operator seat, or a transition position between the open and closed positions.

In some exemplary embodiments, the cab includes a linkage (330) coupled to the cab frame and to the cab door and configured to define a path of movement for and support the cab door as the cab door moves between the closed position and the open position overhead of the operator seat. In some embodiments, the linkage is a four-bar linkage. The display is positioned such that neither the cab door nor any links of the linkage obstruct the operator's view of the display as the cab door moves between the closed position and the open position overhead of the operator seat. In some embodiments, in the open position, the cab door is positioned by the linkage beneath the top of the cab frame.

In some embodiments, the cab further includes a joystick controller (468) positioned forward of the operator seat. The display is mounted to the pillar at a position such that, with the operator seat moved to its forward most position and with the joystick controller raised to its highest position, the display remains a distance (484) above the joystick controller. In some exemplary embodiments, the distance is at least six inches.

In some embodiments, the cab further includes a display mount (488) mounting the display to the pillar and configured to allow the display to be moved relative to the pillar. The display mount can be configured to allow the display to be rotated between a portrait display position and a landscape display position.

In some embodiments, the display is configured to automatically display different information in the portrait display position and the landscape display position.

In some embodiments, the cab further includes a camera (622), and the display is configured to display operational information when in the portrait display position and to display a video feed from the camera when in the landscape display position. In some embodiments, the video feed from the camera is a video feed of a cutting edge of a tool attached to the power machine.

In some exemplary embodiments, a cab (250; 350; 450; 550; 650) for a power machine (100; 200) includes a cab frame (210; 310) forming an operator compartment and having a first side wall (312), a second sidewall (314), a front (316), a rear (318), a top (320) and a bottom (323). An operator seat (364; 464; 564) is positioned within the cab. A cab door (324; 424; 524; 624) is configured to cover an opening (326) in the front of the cab frame when in a closed position and to be moved between the closed position and an open position overhead of the operator seat. A display (502) is mounted to the cab door at a position which provides visual access to the display by an operator positioned on the operator seat with the cab door in the closed position and with the cab door in the open position overhead of the operator seat.

In some embodiments, the display is mounted to the cab door at a position in a bottom half of the cab door and centered in front of the operator seat. Further, in some embodiments, the display is mounted at an angle relative to the cab door such that, with the cab door in the closed position the display is angled upward and with the cab door in the open position overhead of the operator seat the display is angled downward to provide improved viewing angles for the operator with the cab door in both of the closed position and the open position overhead of the operator. In some exemplary embodiments, the angle is between 30 degrees and 60 degrees.

In some embodiments, the cab further includes a moveable mount (512) mounting the display to the cab door and configured to allow an orientation of the display relative to the cab door to be adjusted.

In some exemplary embodiments, a cab (250; 350; 450; 550; 650) for a power machine (100; 200) includes a cab frame (210; 310) forming an operator compartment and having a first side wall (312), a second sidewall (314), a front (316), a rear (318), a top (320) and a bottom (323). An operator seat (364; 464; 564) is positioned within the cab. A cab door (324; 424; 524; 624) is configured to cover an opening (326) in the front of the cab frame when in a closed position and to be moved between the closed position and an open position overhead of the operator seat. A display (602) is mounted to a portion of the cab frame below the opening (326) and the cab door when the cab door is in the closed position.

In some exemplary embodiments, the display is mounted under a lip (626) of the cab frame to protect the display and to prevent the display from interfering with operator ingress and egress.

In some exemplary embodiments, the cab further includes a camera (622) and the display, mounted for example below the opening (326), is configured to display a video feed from the camera. In some exemplary embodiments, the video feed from the camera is a video feed of a cutting edge of a tool attached to the power machine.

These and other features of the disclosed cabs and power machines are described in detail below. The above described and other features of the various disclosed embodiments can be included in differing combinations.

DRAWINGS

DETAILED DESCRIPTION

The concepts disclosed in this discussion are described and illustrated by referring to illustrative embodiments. These concepts, however, are not limited in their application to the details of construction and the arrangement of components in the illustrative embodiments and are capable of being practiced or being carried out in various other ways. The terminology in this document is used for description and should not be regarded as limiting. Words such as "including," "comprising," and "having" and variations thereof as used herein are meant to encompass the items listed thereafter, equivalents thereof, as well as additional items.

Disclosed are displays for cabs, and power machines with cabs, having doors that are moveable between opened and closed positions. In some illustrative embodiments, the door is positioned within an operator compartment of the cab above the operator seat and below a top of the cab when in the opened position. In some embodiments, a display is positioned on a frame adjacent to a door opening at a height which is above a path of an operator joystick, but which does not intersect a path of the door when the door is moved to the opened position above the operator seat and below a top of the cab. In other embodiments, the display is positioned on the door and moves with the door between the closed and opened positions. In these embodiments, the display can be oriented at an angle which allows viewing by an operator with the door in both of the closed and opened positions. In still other embodiments, the display is positioned beneath the door opening. In some embodiments, the display is configured to show the user a cutting-edge view from a camera to aid in the operator's control of the power machine while using a bucket or other implement to perform a work task. These and other features of the disclosed cabs and power machines are described in detail below.

Figure 2:
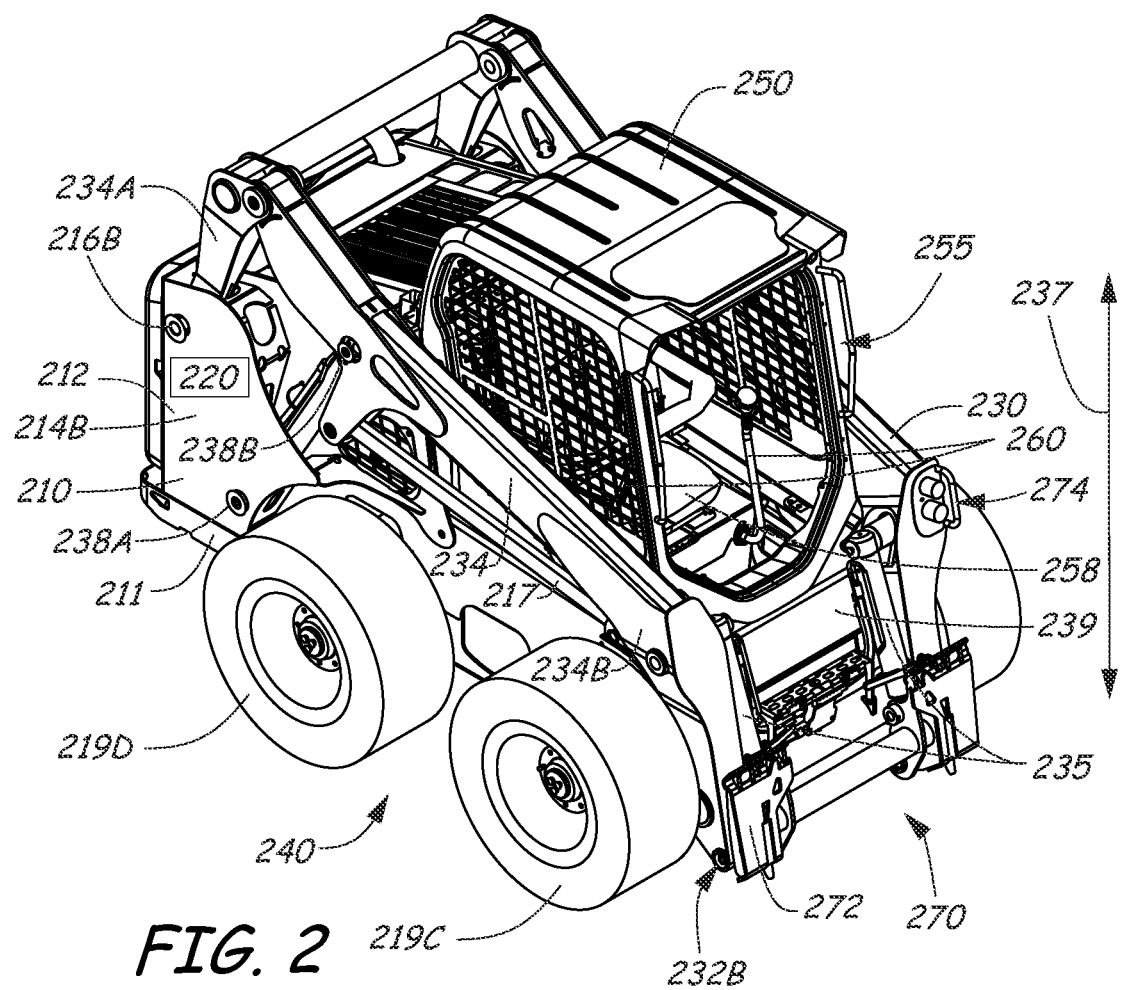
FIGS. 2-3 illustrate perspective views of a representative power machine in the form of a skid-steer loader of the type on which the disclosed embodiments can be practiced.
Figure 3:
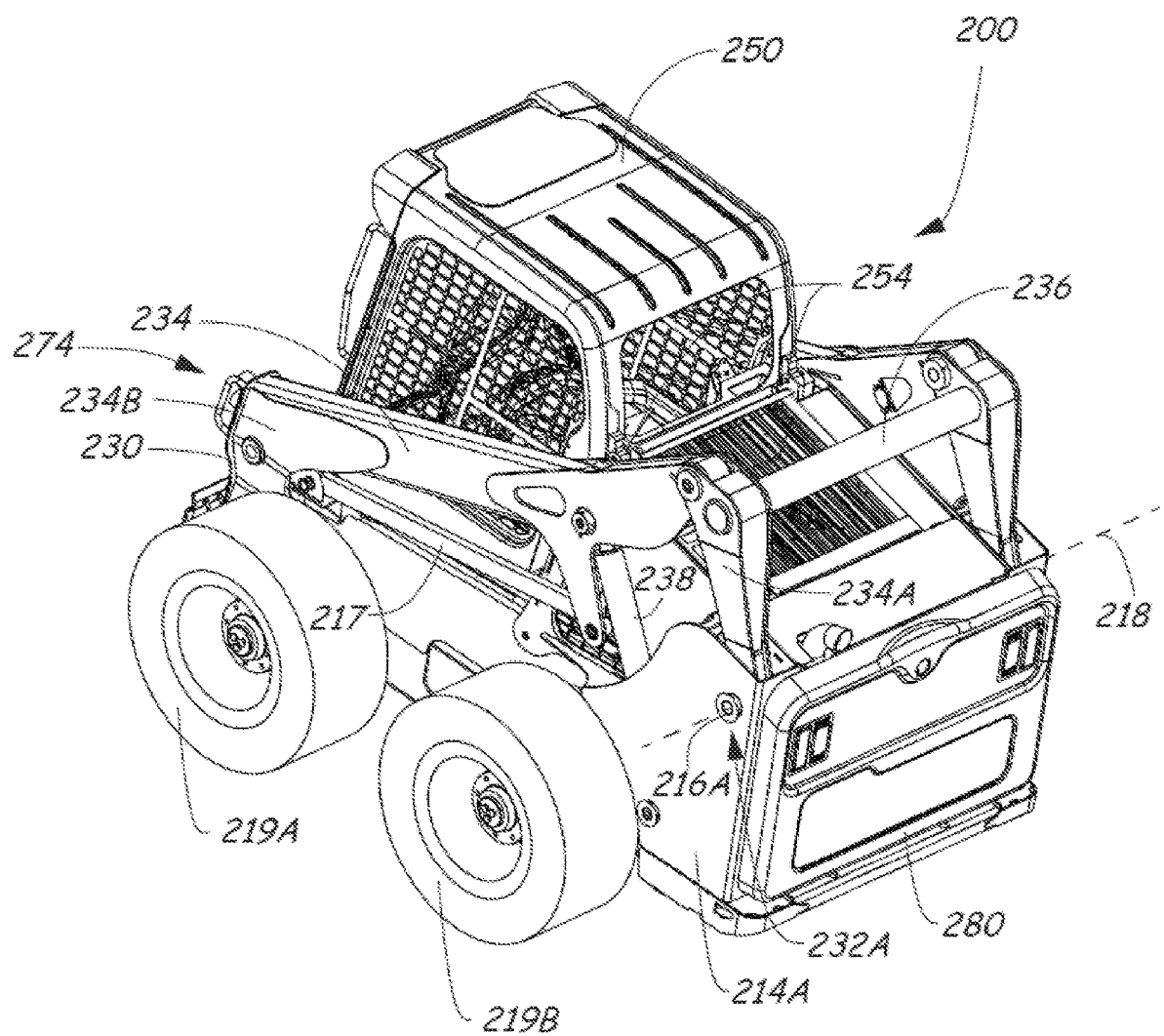

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of several power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Figure 1:
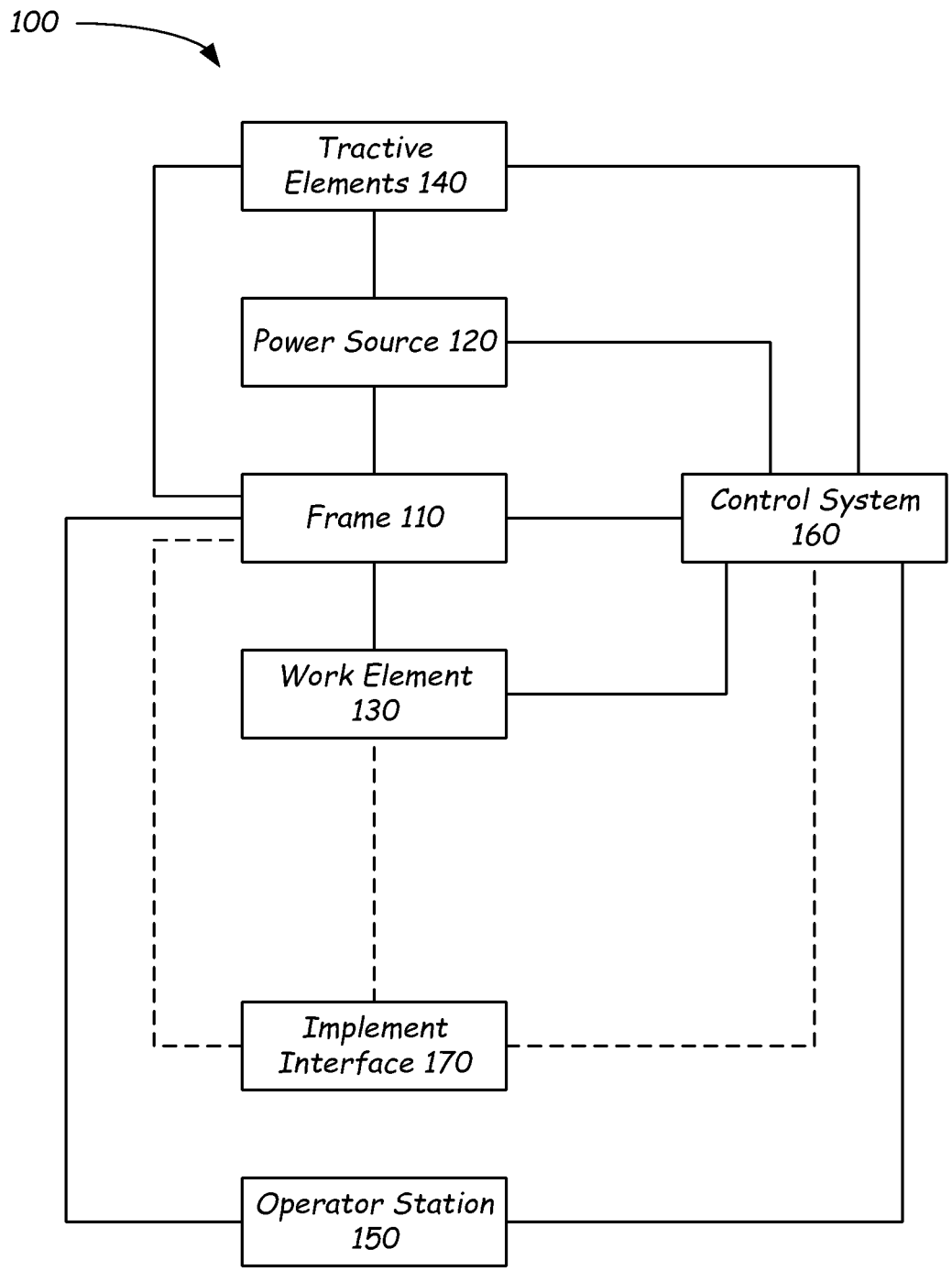
FIG. 1 is a block diagram illustrating functional systems of a representative power machine on which embodiments of the present disclosure can be advantageously practiced.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement for performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of several implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame. Power machine 100 includes an operator station 150 that includes an operating position from which an operator can control operation of the power machine. In some power machines, the operator station 150 is defined by an enclosed or partially enclosed cab.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system can generate or otherwise providing power for operating various functions on the power machine. Power system 220 is shown in block diagram form, but is located within the frame 210. Frame 210 also supports a work element in the form of a lift arm assembly 230 that is powered by the power system 220 and can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and securing various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 is accessible from an opening in the front of the cab. Although not shown in FIGS. 2-3, in many instances, a door is provided to cover the opening and is positionable between a closed and an opened position. Many of these doors are pivotally mounted about a vertical axis so that door pivots outward from the door when in the opened position. When the door is in the opened position, it is necessary for the lift arm 234 (as discussed below) to be in in the lowered position because the door would otherwise interfere with the lift arm or components on the lift arm, specifically tilt cylinder actuators. Cab 250 can be pivoted back about an axis that extends through mounts 254 to provide access to power system components as needed for maintenance and repair. Access to power system components can also be provided by opening a tailgate 280 that is pivotally mounted to the frame 210 of the power machine at a rear end thereof.

The operator station 255 includes an operator seat 258 and a plurality of operation input devices, including control levers 260 that an operator can manipulate to control various machine functions. Operator input devices can include buttons, switches, levers, sliders, pedals, and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219A-D, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

As referred to briefly above, the lift arm assembly 230 has a pair of lift arms 234 that are disposed on opposing sides of the frame 210. A first end 232A of each of the lift arms 234 is pivotally coupled to the power machine at joints 216 and a second end 232B of each of the lift arms is positioned forward of the frame 210 when in a lowered position as shown in FIG. 2. Joints 216A-B are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The first portions 234A of the lift arms 234 are each coupled to each other via a cross member 236. Cross member 236 provides increased structural stability to the lift arm assembly 230. The second portions 234B via a cross member 239 that is attached to each of the second portions of the lift arms 234B. Cross member 239 provides increased structural stability to the lift arm assembly 230.

A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that can accept and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as loader 200, unless otherwise noted or recited, the concepts discussed below are not intended to be limited in their application to the environments specifically described above.

Figure 4:
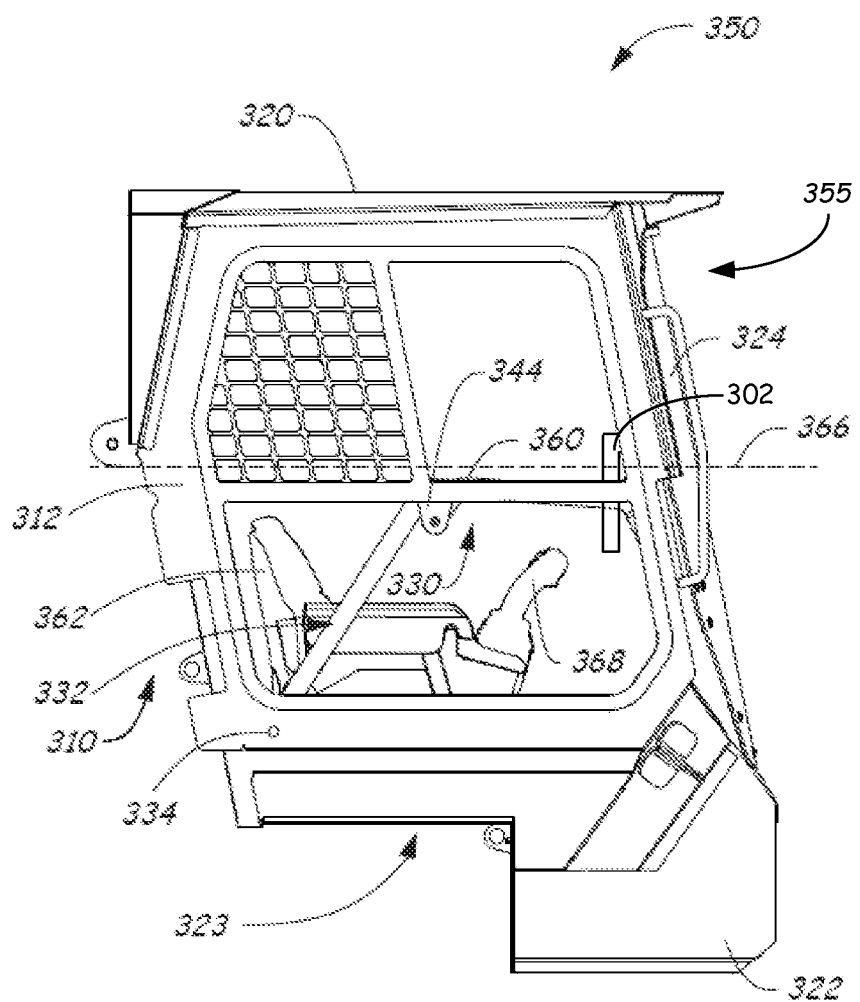
FIG. 4 is a side view illustration of a cab, with a door in a closed position and moveable between the closed position and an open position by rotating upward and downward within the cab, having a display positioned on the frame to a side of the door according to one illustrative embodiment.
Figure 4A:
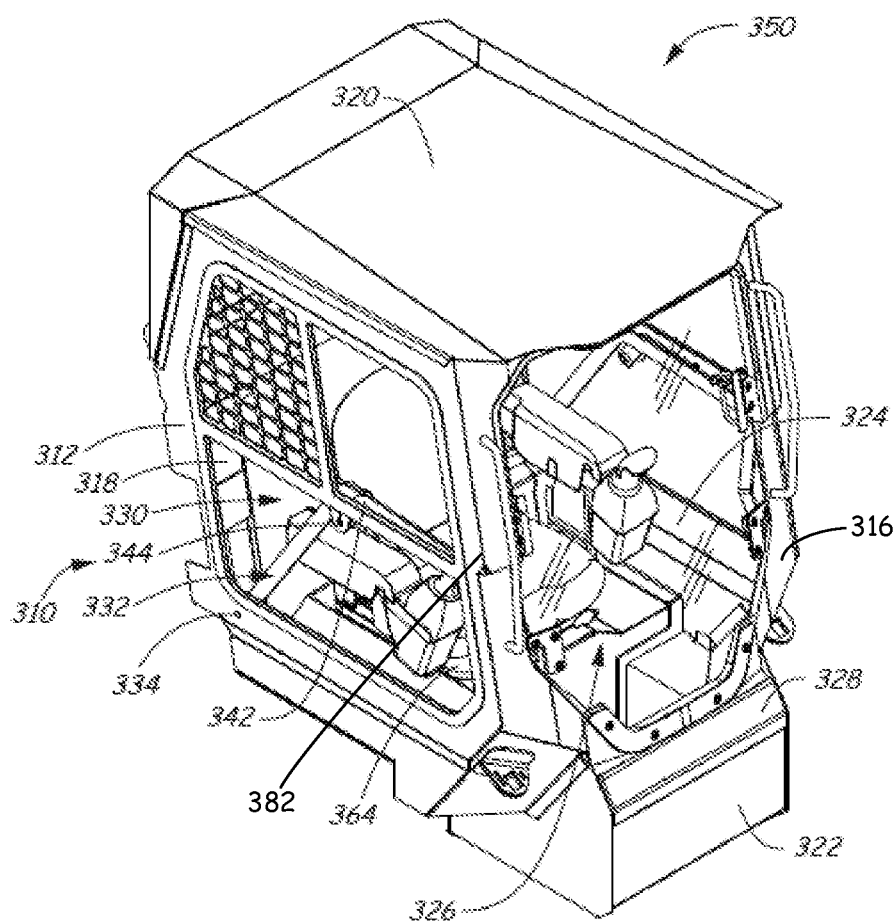
FIG. 4A is a perspective view illustration of the cab shown in FIG. 4 with the door in the closed position and with the display omitted to better show features of the cab and door.
Figure 5:
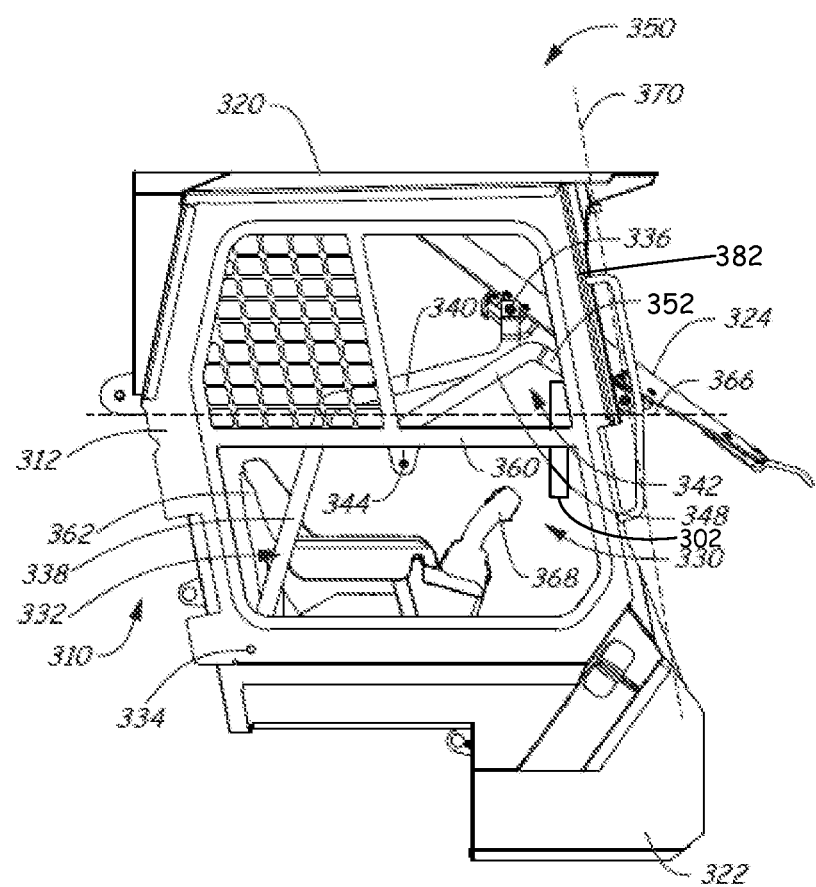
FIG. 5 is a side view illustration of the cab shown in FIG. 4 with the door in a partially opened position.
Figure 5A:
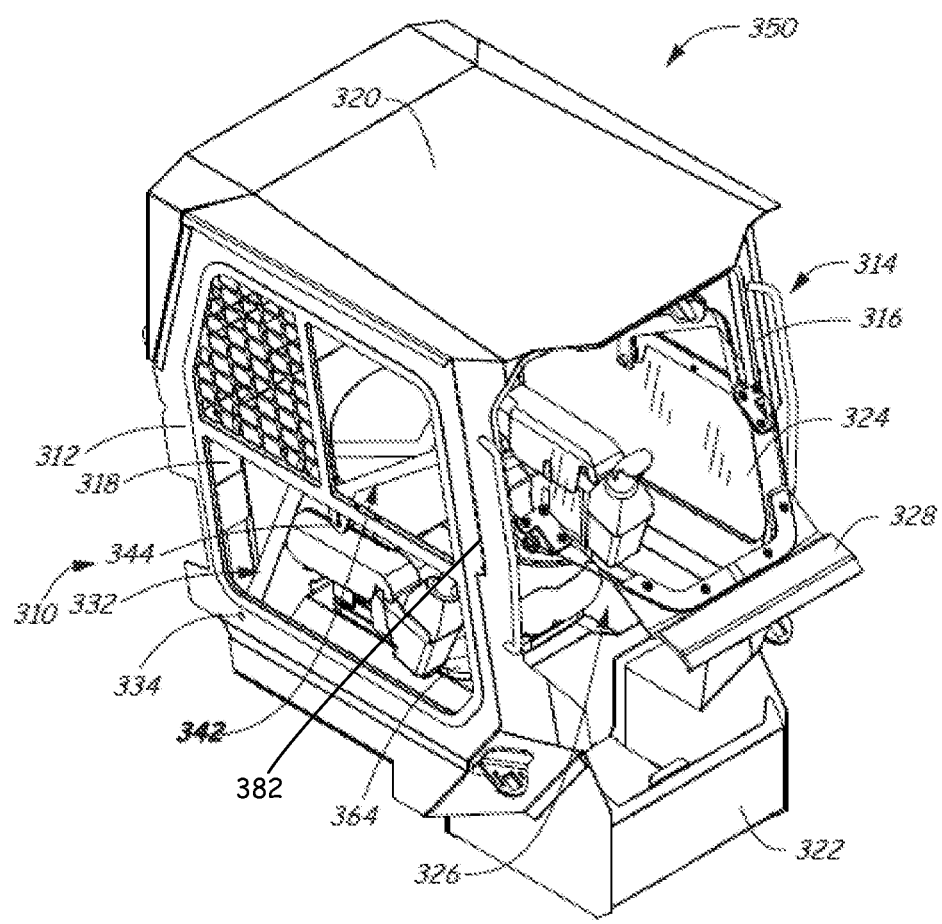
FIG. 5A is a perspective view illustration of the cab shown in FIG. 5 with the door in the partially opened position and with the display omitted to better show features of the cab and door.
Figure 6:
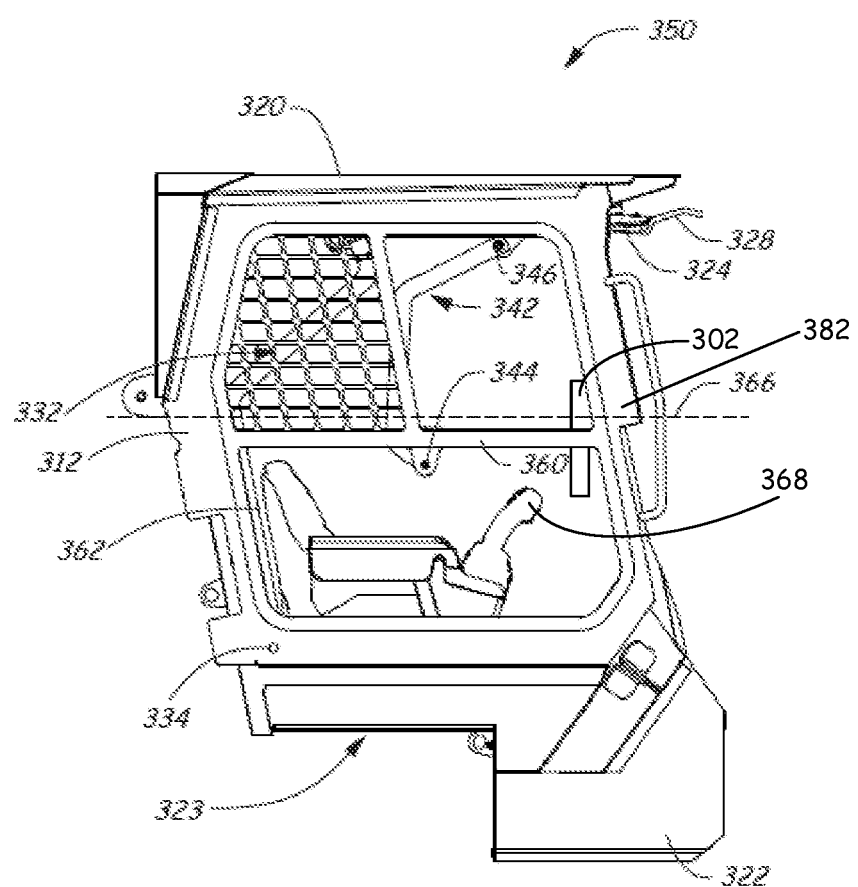
FIG. 6 is a side view illustration of the cab shown in FIG. 4 with the door in a fully opened position.
Figure 7:
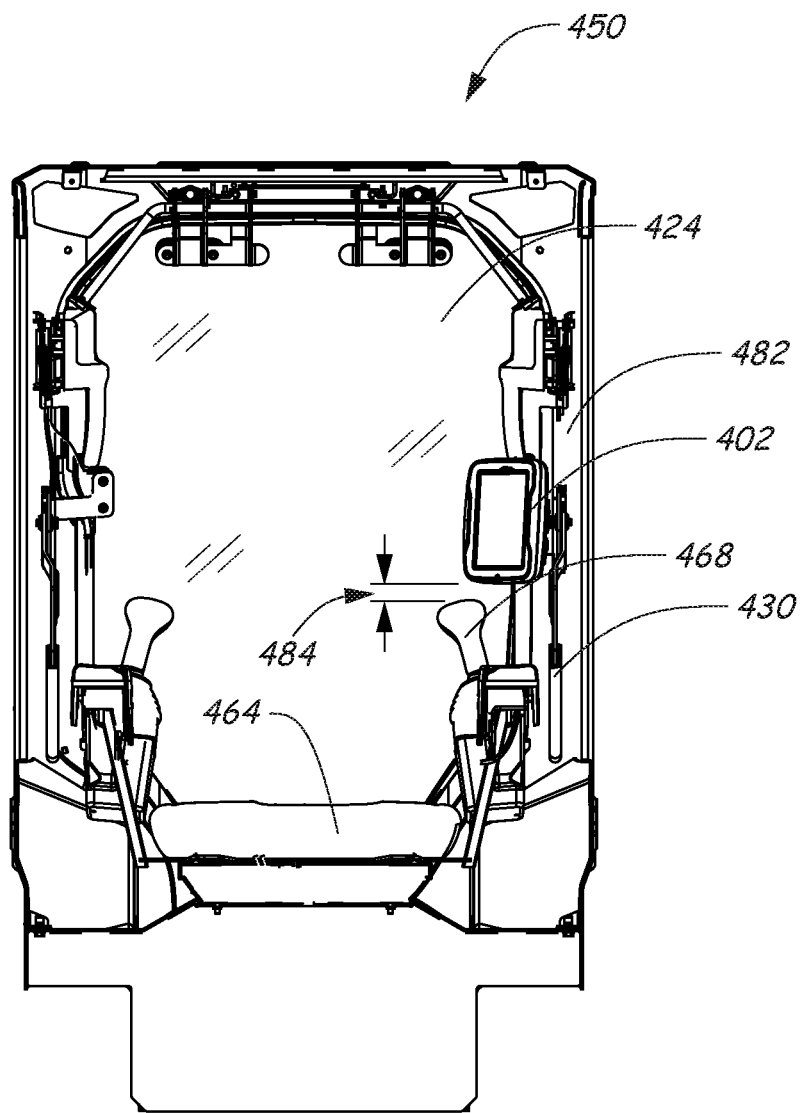
FIG. 7 is a rear-view illustration of a cab similar to the cab shown in FIG. 4 with a door in a closed position, further illustrating a position of the display in an exemplary embodiment.
Figure 8:
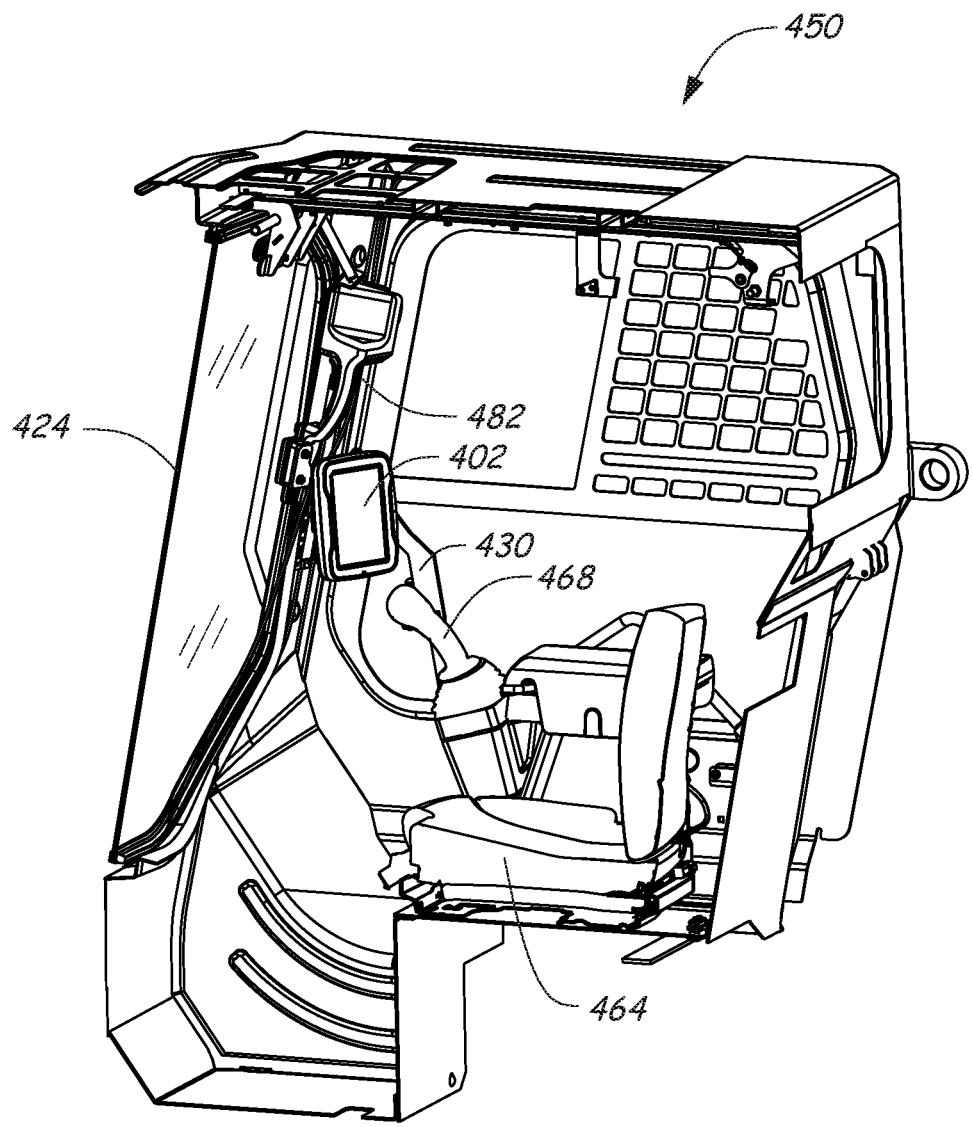
FIGS. 8 and 9 are, respectively, a side perspective view and a side view the cab shown in FIG. 7, further illustrating a position of the display in an exemplary embodiment with the door in a closed position.

FIG. 4 is a side view illustration of a cab 350 providing an operator compartment or station 355 with a display 302 configured and positioned to facilitate the use of an overhead opening door, according to one illustrative embodiment. FIG. 4A is a perspective view of cab 350, with the display 302 omitted to simplify the illustration of other cab and door features. FIGS. 4 and 4A illustrate cab 350 with the door in the closed position. FIGS. 5 and 5A are side and perspective view illustrations of cab 350 with the door in a partially open position. Display 302 is omitted in FIG. 5A to simplify the illustration of other cab and door features. FIG. 6 is a side view illustration of the cab 350 with the door in the fully opened position.

Cab 350 is generally similar to the cab 250 in the sense that it provides an operator station such as operator station 150 discussed above. Cab 350 also advantageously provides an improved structure that allows a door to be moved between closed and opened positions to provide an operator better cab ingress and egress, prevents door interference with a lift arm structure, and minimizes interference with operator visibility. Display 302 is mounted within cab 350 in a corner at a position that both provides the operator with improved visual access to the display and avoids interference with a door 324 and door linkages (330, see below) as the door is moved from a closed position to an opened position above the operator's head. Other benefits of various disclosed embodiments will also be apparent in the following disclosure.

Cab 350 has a cab frame 310 having first and second side walls 312 and 314, a front side 316, a rear side 318, a top side 320, and a bottom side 323. Display 302 is mounted in a corner between the front side 316 and side wall 312 on an interior of the cab as is described below in greater detail. As shown, the display 302 is mounted on a right-hand side of the cab from the perspective of an operator. Although not shown here, the display 302 is, in some embodiments, mounted on the left-hand side of the operator.

A seat 364 is supported on the bottom side 323 of the cab frame 310. The cab frame 310 also defines a lower portion 322, positioned below the bottom side 323, where the seat is supported in which an operator can position feet during machine operation. As shown, the front side 316 of the cab 350 extends down and forms a front of the lower portion 322. The remainder of the bottom portion can be formed from individual pieces of material and attached such as by welding to the side walls 312 and 314 or parts of the lower portion 322 can be formed as part of the side walls. In FIGS. 4 and 4A, cab door 324 is in a closed position at the front of the operator compartment 350 covering an opening 326 in front portion 316 of frame 310. FIGS. 5 and 5A illustrate cab door 324 in a partially open position, and FIG. 6 illustrates cab door 324 in a fully open position. Cab door 324 includes, in some embodiments, a cover portion 328 that at least partially covers and/or forms a part of, lower portion 322 when door 324 is in the illustrated closed position. In some exemplary embodiments, cover 328 is raised and lowered with door 324. Thus, when door 324 is raised to the open position shown in FIG. 6, the opening 326 through which the operator moves into and out of the cab is fully or nearly fully unobstructed to provide improved ingress and egress. The cover portion 328 is shown as extending beyond (i.e., forward of) top side 320 in the opened position, but in some embodiments, the cover portion does not extend beyond the top side 320.

In some exemplary embodiments, a linkage 330 is provided on each of first and second sides 312 and 314 to couple door 324 to frame 310 and to control movement of the door between closed and open positions along a configured path. The linkage 330 shown in FIGS. 4-6 is a four-bar linkage arrangement that includes a first link 332 and a second link 342 each of which are pivotally attached to the frame 310 and the door 324. The first link 332 is pivotally attached to frame 310 at first pivot connection 334. Portions of the frame 310 between attachment points of links 332 and 342 to the frame act as the third link of the four-bar linkage. The portion of the door 324 between the connection points provides the fourth link of the four-bar linkage 330. In exemplary embodiments, four-bar linkage 330 includes features that provide a movement path for door 324 such that, when moved to a fully open position (shown in FIG. 6), door 324 is positioned horizontally above the operator's head, but inside or substantially inside of the cab. Thus, in the fully opened position, door 324 extends at least partially horizontally beneath the top side 320 as is discussed below in greater detail. While raising door 324 along the movement path provided by four-bar linkage 330, door 324 extends beyond a front plane (represented by dashed line 370) of cab 350 as shown FIG. 5, but does not interfere with any portion of the lift arm (such as, for example, cross member 239 shown in FIG. 2) of the power machine, regardless of the position of the lift arm relative to the frame (i.e., whether it is fully lowered or not). Alternatively, the door can be positioned so that it does not extend forward of the front side 316 of the cab 350. Further, display 302 mounted on pillar 382 to one side (e.g., the right side) of the operator seat is positioned such that neither door 324 nor any of the individual links of linkage 330 contact the display as the door moves from the closed position to the opened position as shown in FIG. 5. The links and door also do not obstruct the operator's view of display 302 as the door moves from the closed position to the overhead opened position.

In the illustrated embodiment, first link 332 of the four-bar linkage has a first pivot connection 334 to the frame 310 configured to allow link 332 to rotate relative to frame 310. Link 332 also has a second pivot connection 336, to door 324, which is better shown in the partially open-door position of FIGS. 5 and 5A. Second pivot connection 336 is configured to allow link 332 and door 324 to pivot relative to one another. In some exemplary embodiments, first link 332 includes at least a first link section 338 and a second link section 340, which are best shown in FIG. 5. Link sections 338 and 340 of first link 332 are rigidly connected or continuously formed such that sections 338 and 340 do not pivot or rotate relative to each other. In some embodiments, link sections 338 and 340 are oriented or arranged such that the link sections form an obtuse angle relative to one another. Forming an obtuse angle between link sections 338 and 340 of first link 332 can, in various embodiments, serve several purposes. For example, such a configuration provides the range of motion over which door 324 movement is constrained between the closed and open positions. Further, while providing that door movement, the obtuse angle between link sections 338 and 340 allows link section 340 to be positioned along a horizontally extending reinforcement 360 of the cab side wall 312 when door 324 is in the closed position. This prevents or reduces obstruction of the operator's view by first link 332, and thereby improves visibility.

Similar to first link 332, second link 342 of the four-bar linkage has a first pivot connection 344 to the frame 310 configured to allow link 342 to rotate relative to frame 310. For example, pivot connection 344 can be on or near horizontally extending reinforcement 360, or elsewhere on side wall 312. As shown in the simplified illustration of FIGS. 4-6, portions of horizontally extending reinforcement 360 or of side wall 312 are removed to better show a location of pivot connection 344. Second link 342 also has a second pivot connection 346, to door 324, which is again better shown in FIG. 6. Second pivot connection 346 is configured to allow link 342 and door 324 to pivot relative to one another.

Like first link 332, in some exemplary embodiments, second link 342 includes at least a first link section 348 and a second link section 352, which are best shown in FIG. 5. Link sections 348 and 352 of second link 342 are rigidly connected or continuously formed such that sections 348 and 352 do not pivot or rotate relative to each other. Also like first link 332, in some embodiments of second link 342, link sections 348 and 352 are oriented or arranged such that the link sections form an obtuse angle relative to one another to move door 324 along the desired path, and in order to allow link section 352 to be positioned along horizontally extending reinforcement 360 when door 324 is in the closed position. The obtuse angle formed by sections of link 342 need not be the same as the obtuse angle formed by sections of link 332. This masking of the links 332 and 342 by the cab structure when the door is in the closed position can provide significant improvement in side visibility by an operator of the power machine. Also, providing the links 332 and 342 as shown for each four-bar linkage allows coupling of the door 324 to the cab without hindering or interfering with forward visibility of the operator when the door is in the fully opened position shown in FIG. 6. In other embodiments, different linkages can be employed. Such linkages can be positioned in alternative positions from the linkage 330 to remain as unobtrusive to the operator as possible. One advantageous feature of the linkage configuration shown in FIGs. is that as the door moves from a closed position to an open position, a bottom portion of the door extends out of the operator compartment space. As a result, the door moves along a path that allows for maximum headroom while the door is moving. In addition, the portion of the door that extends out of the cab also clears the lift arm no matter where the lift arm is positioned along its travel path. Various linkages can be used to position the door and insofar as the position of the display in the cab is concerned, no one linkage arrangement is vital if the linkage does not interfere with the display when moving from one position to another or especially if the linkage does not impair the view of the display from an operator's perspective. The linkages themselves and how they operate to move the door between a closed position and an opened position above the operator's head are a separate matter from the position of the display and various embodiments have their own unique advantages.

In exemplary embodiments, placement of pivot connections 334 and 344 has been found to allow for improved or optimized operation of the four-bar linkage 330 in moving door 324 along its configured path, while also allowing impact on visibility to be reduced. For example, in some exemplary embodiments, it has been found that placement of lower pivot connection 334, from a side view perspective, rearward of an operator seatback 362 and below an operator seat 364 provides improved results. Also, in some exemplary embodiments, it has been found that placement of upper pivot connection 344 vertically near the horizontal reinforcing member 360 is beneficial. In some alternative or more specific embodiments, placement of upper pivot connection 344 below a horizontally extending center line 366 (centered vertically) of the cab side wall 312 provides improved results. In some embodiments, upper pivot connection 344 can be in a position forward of seat back 362 but rearward of joystick 368. For example, upper pivot connection 344 can be positioned at or adjacent to the Seat Index Point (SIP) for the operator seat, as defined by the seat manufacturer according to a standard such as the European Standard EN ISO 3411:2007.

Referring now to FIGS. 7-10, shown is another embodiment of a cab 450, similar to cab 350 shown in FIGS. 4-6, having a display 402 mounted on a pillar 482 forward and to one side of operator seat 464. In the illustrated embodiment, the display 402 is mounted on the right-hand side of the operator seat 464. However, in other embodiments, display 402 can be mounted to the left-hand side of the operator seat. In still other embodiments, display 402 can be moveable between data ports on the pillars on either side of the operator seat.

Cab 450 has a door 424 at the front of the cab that opens to an overhead position using a linkage 430 on each side of cab 450. Linkage 430 can be similar to linkage 330, though they need not have the same configuration of individual links. Generally, linkages 430 on each side of the operator seat 464 in cab 450 are four-bar linkages, with the moveable individual links moving on the sides of the cab in positions that do not interfere with the operator, the joysticks 468, or the display 402. Seat 464 can be configured to slide forward and backward to accommodate different sized operators, and joysticks 468 can be configured to be moved up and down for the same purpose. The display 402 is positioned at a height such that, even with the seat 464 moved all the way forward and joysticks 468 raised to their highest positions, the display remains a distance 484 (shown in FIG. 7) above the corresponding (e.g., right hand side) joystick 468. The distance 484 is selected such that the display does not interfere with the corresponding joystick 468 or the operator's hand (positioned on the joystick) at any point along the joystick path, even at the highest joystick position along the arcuate path of the joystick, at the forward most actuated position of the joystick, etc. In one embodiment, distance 484 is at least six inches.

In some embodiments, display 402 is also positioned at a height such that the display remains a second distance 486 (shown in FIG. 10) below door 424 as the door moves between its closed position (shown in FIGS. 7-9) toward the overhead opened position. FIG. 10 illustrates door 424 in an intermediate position along the path toward the overhead opened position. In one exemplary embodiment, the second distance 486 is at least two inches. Display 402 is configured to be useable by the operator with the door at any position. Thus, the display can be used not only with the door fully closed, but also with the door fully opened and stored overhead of the operator. Further, the display remains operational at intermediate positions of the door as the door travels between the closed and open positions such that if the door can be maintained in an intermediate position (and this is not the case with the linkages 430) the display is still visible to the operator, unobstructed by any of the door 424 or any linkages that movably attach the door 424 to the frame.

Figure 9:
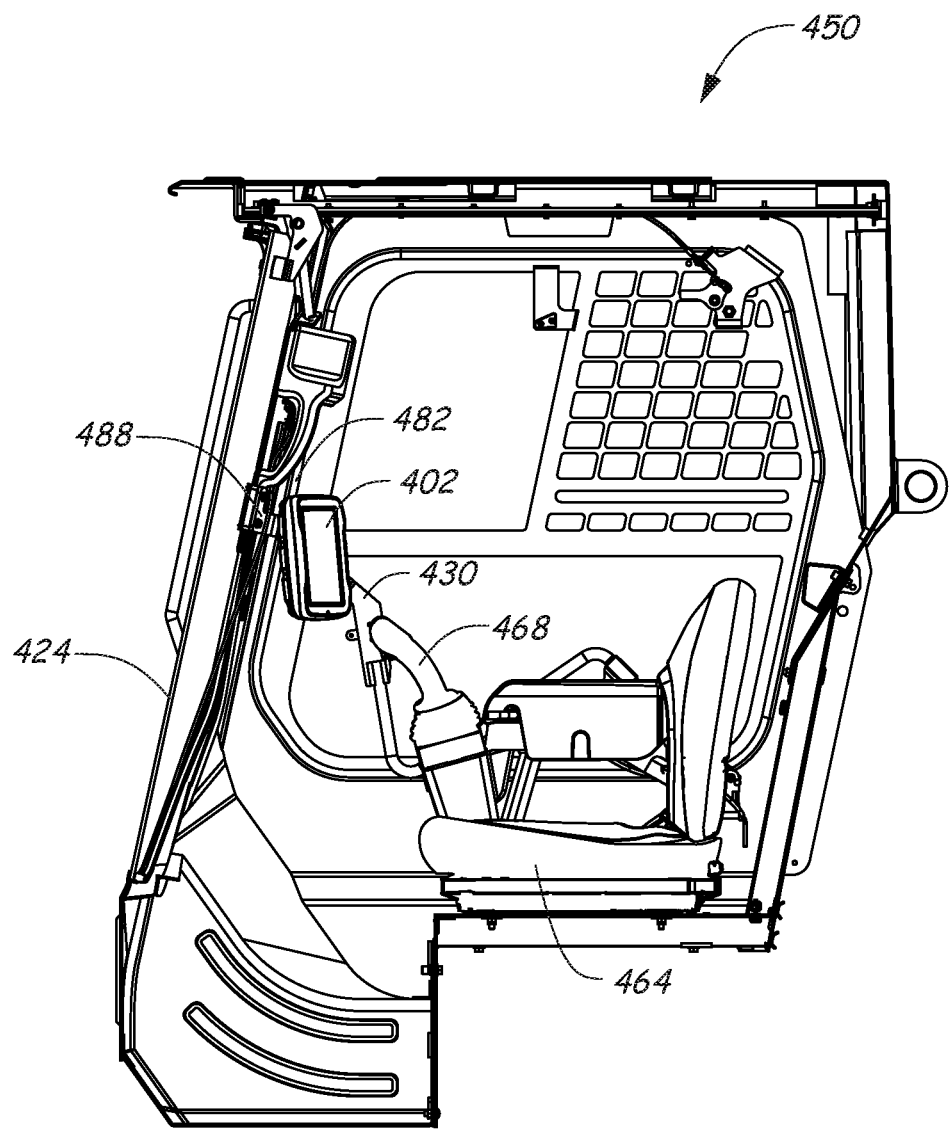
Figure 10:
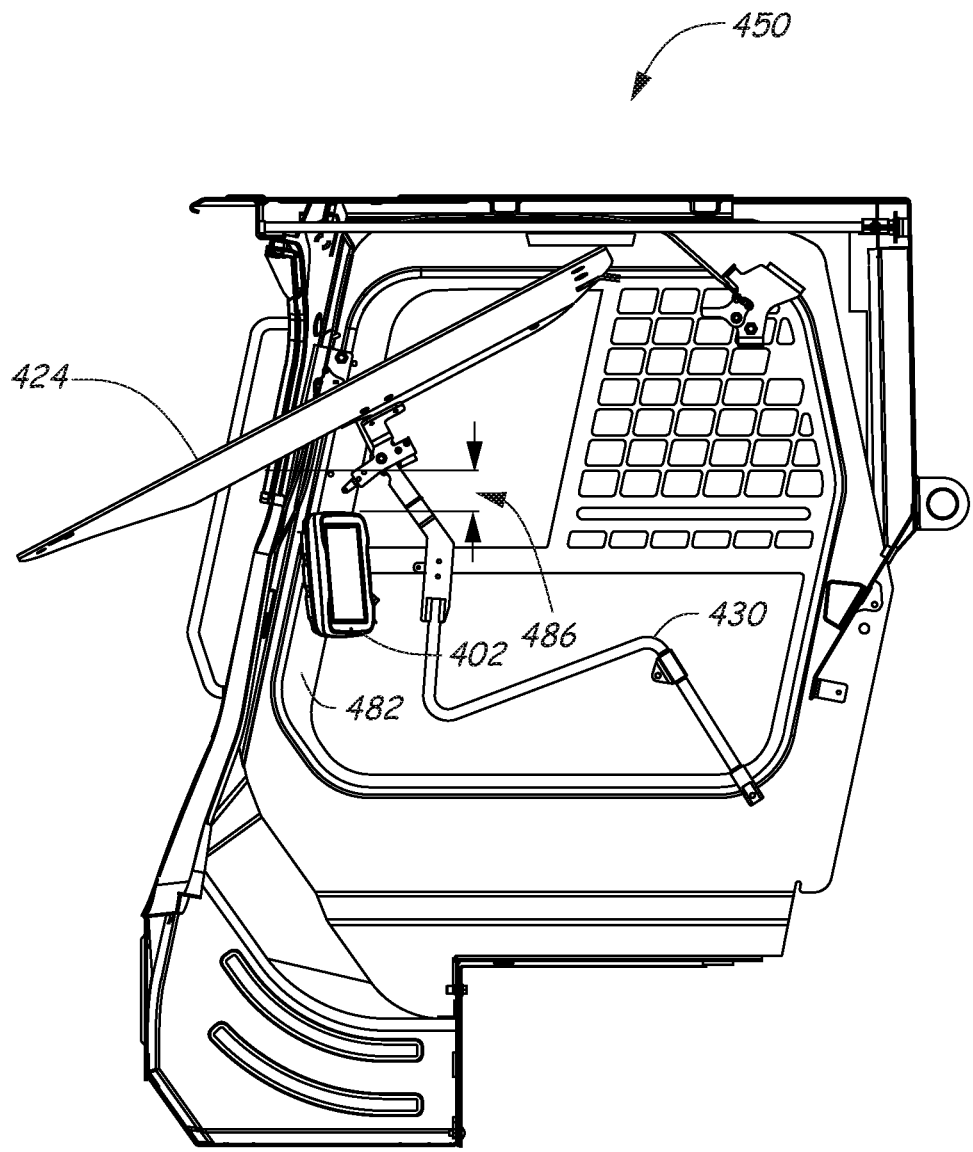
FIG. 10 is a side view of portions of the cab shown in FIG. 7 illustrating the display with the door in a partially open position.

In exemplary embodiments, the display 402 can be mounted to pillar 482 using a display mount 488 (shown in FIG. 9). Mount 488 can be any type of display mount that is suitable for attaching the display to the cab 450. For example, display mount 488 can be a hinged display mount that allows the display 402 to be moved or rotated to change viewing angles for different operators, to move the display during ingress into and egress from the cab, etc. In other embodiments, a spherical ball joint can be used to allow the display to be moved for these or other purposes. In still other embodiments, the display is configured to be rotated between portrait and landscape positions, and to change the user interface represented on the display based upon the portrait or landscape position of the display. For instance, the display can be configured to show the user operational control information while in the portrait orientation, and to show the user a video feed from a camera while in the landscape orientation. This would allow the display to show the user a camera view of the cutting edge of an attached bucket or implement to allow the user better control in a work operation. A cutting-edge viewing system is described in further detail below with reference to FIGS. 15-16. In still other embodiments, the display can be fixed to the pillar 482 and not moveable.

Figure 11:
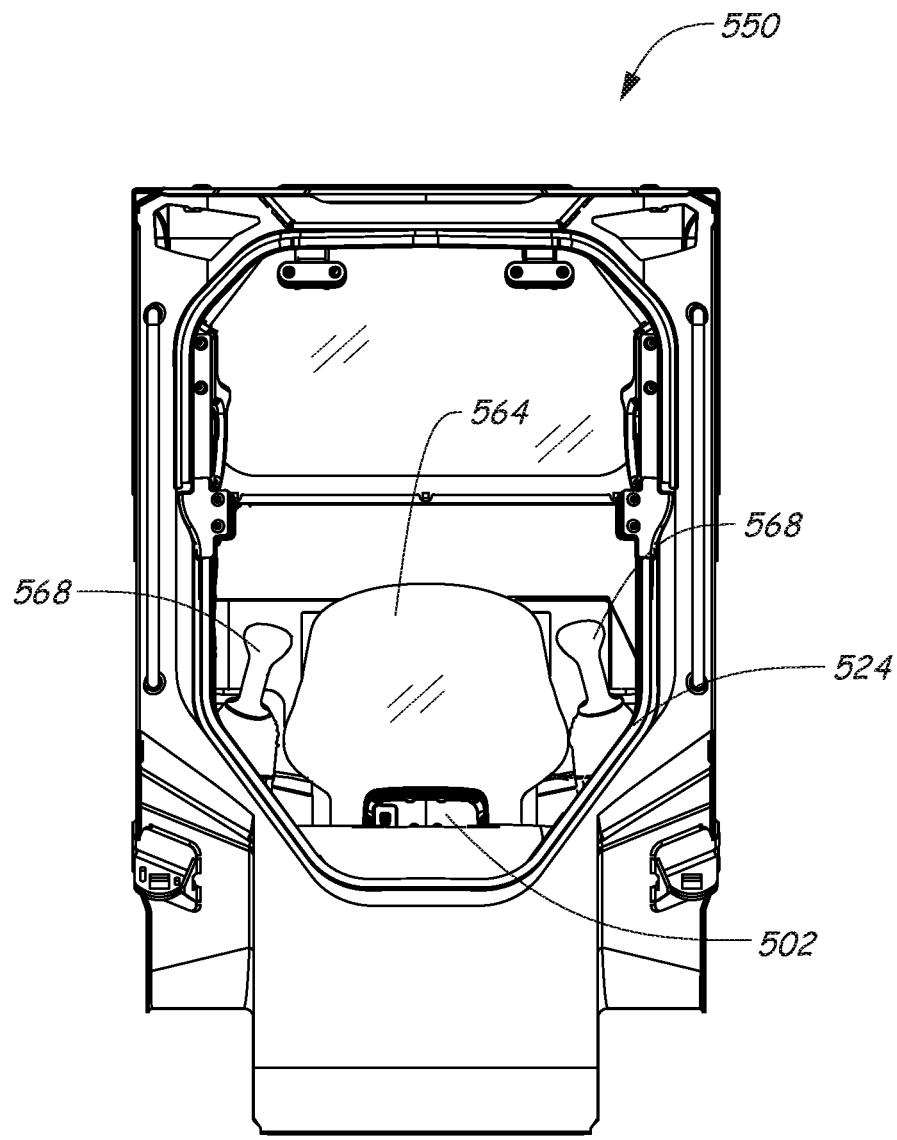
FIG. 11 is a front view illustration of a portion of a cab, with a door in a closed position and moveable between the closed position and an open position by rotating upward and downward within the cab, having a display positioned on the door according to another illustrative embodiment.
Figure 12:
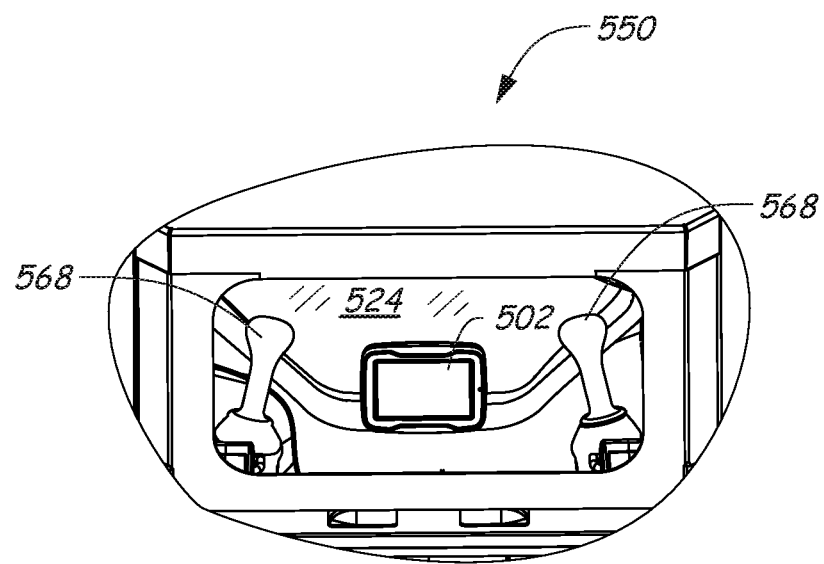
FIG. 12 is a rear-view illustration of the cab and display shown in FIG. 11 with the door in the closed position and the display mounted to the door.
Figure 13:
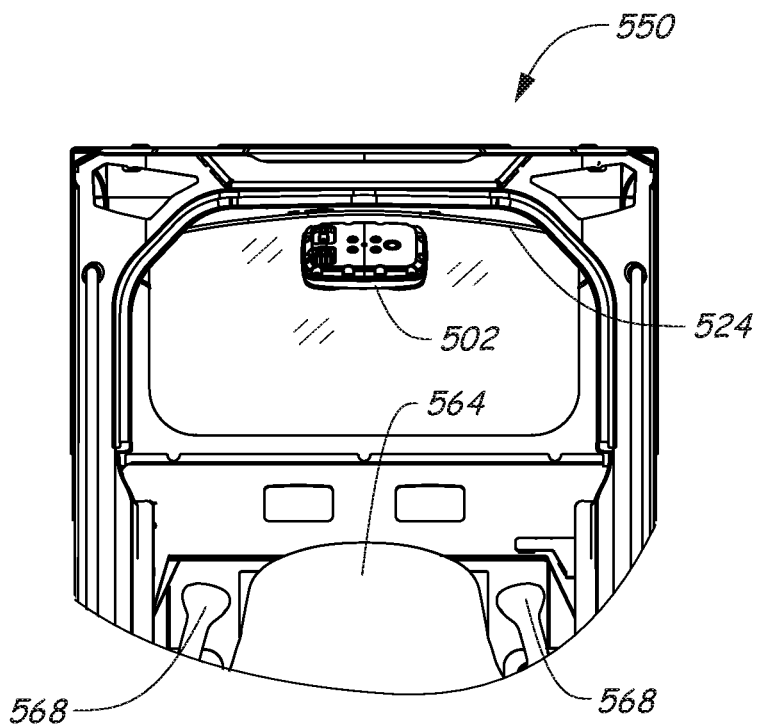
FIG. 13 is a front-view illustration of the cab and display shown in FIG. 11 with the door in the open position and the display mounted to the door.

FIGS. 11-13 illustrate another embodiment of a cab 550, like cabs 350 and 450, having a front entry door 524 which moves from a closed position (shown in the front and rear views of FIGS. 11 and 12, respectively) to an overhead opened position (shown in FIG. 13). The linkages used to move the door between the open and closed positions are not illustrated but can be the same or like the linkages discussed above with reference to cabs 350 and 450. Also shown in cab 550 are an operator seat 564, joysticks 568, and a display 502.

Figure 14A:
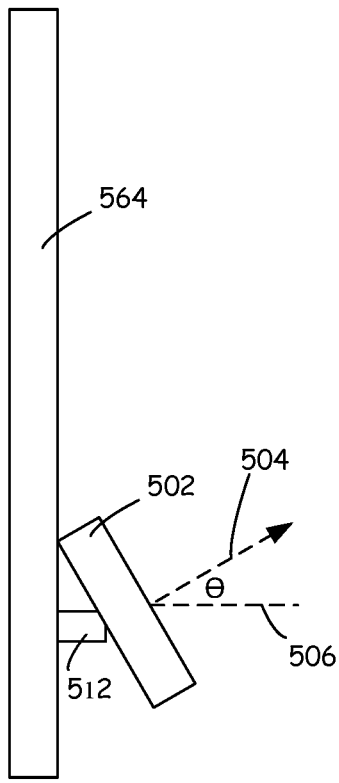
FIGS. 14A and 14B are diagrammatic illustrations of orientations of a door mounted display with the door in closed and opened positions, respectively.

In cab 550, display 502 is positioned on door 524, centered between the knees of the operator when seated on seat 564. Display 502 is positioned toward a bottom of door 524 and is oriented or angled upward (when the door is in the closed position) to provide an improved viewing angle to a seated operator. FIG. 14A provides a diagrammatic illustration of display 502 mounted on door 564 with the door in the closed position (shown in FIGS. 11 and 12). In this position, display 502 is oriented upward with the direction 504 orthogonal to the display screen at an angle Θ relative to the horizontal direction 506.

Figure 14B:
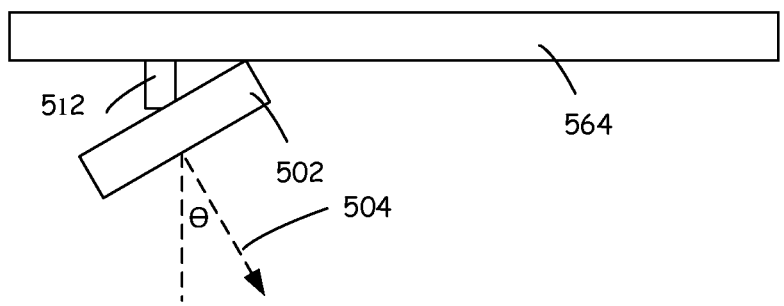

As the door moves to the overhead open position shown in FIG. 13, the orientation of the display relative to the door remains fixed. Thus, in the open-door position, the display is oriented or angled downward to provide an improved viewing angle to the seated operator. FIG. 14B provides a diagrammatic illustration of display 502 and door 564 with the door in the opened position. In exemplary embodiments, angle Θ is selected to provide optimized viewing of the display in the combination of closed and open-door positions. In one exemplary embodiment, angles Θ of between 30 degrees and 60 degrees have been found to provide an optimized combination of viewing in the closed and open positions. The diagrammatic representations of display 502 and door 564 are not intended to provide a representation of actual door shapes, orientations, etc., but instead are provided to represent the selection of a display orientation relative to a reference direction such as the horizontal direction.

In some embodiments, display 502 is mounted on door 524 using a moveable mount 512 which allows the orientation of the display relative to the door or relative to the horizontal direction to be adjusted. The adjustment can be made by the operator, which allows the operator to select the display position for optimized viewing in each of the closed and open-door positions. In other embodiments, the adjustment of display orientation can be automatic using a mechanism or an actuator such as a small electric motor guided with the input from an inclinometer to automatically change the orientation of the display relative to the door or relative to the horizontal direction in different door positions. In still other embodiments, the angle of the display is fixed.

Figure 15:
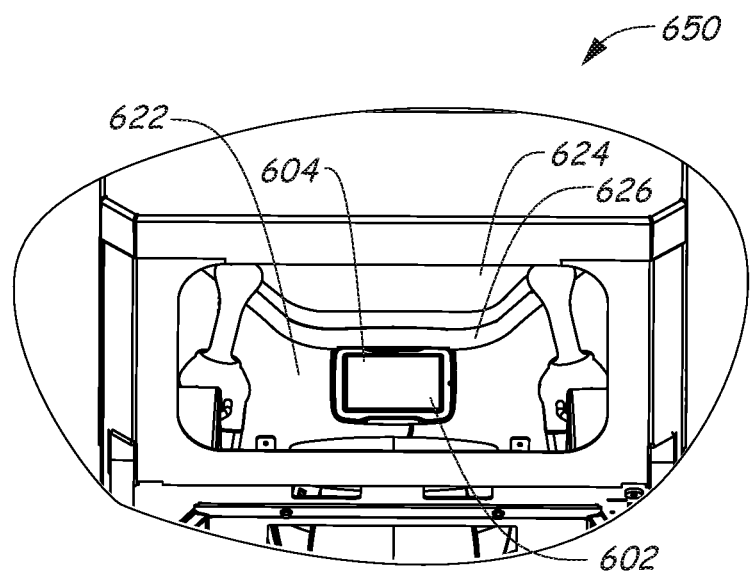
FIG. 15 is a rear perspective view illustration of a portion of a cab having a display positioned beneath a door opening according to another illustrative embodiment.
Figure 16:
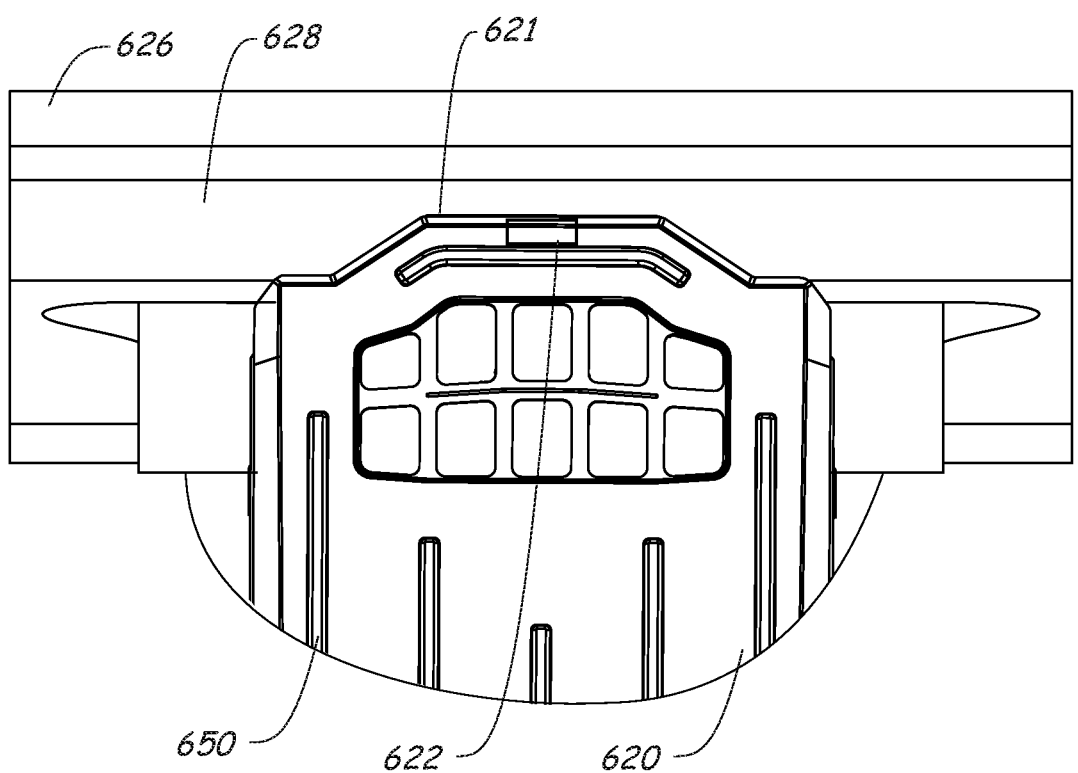
FIG. 16 is a top view illustration of a portion of a cab having a cutting-edge viewing camera according to another illustrative embodiment.

Referring now to FIG. 15, shown is another embodiment of a cab 650, similar to cabs 350, 450 and 550, having a front entry door 624 which moves from a closed position to an overhead opened position. In cab 650, a display 602 is mounted to a portion 622 of the frame below the door 624. In this position, display 602 is mounted to the frame near the operator's feet when seated in the cab, and remains in this position regardless of whether the door 624 is closed or opened. In exemplary embodiments, display 602 is mounted under a lip 626 of the frame below the door to protect display 602 and prevent the display from interfering with operator ingress and egress. In some embodiments display 602 is positioned within a protective casing 604 to protect the display 602 from being damaged by contact with the operator's feet, mud, moisture, etc.

In some embodiments, display 602 is configured to provide the operator with a video feed, from a camera 622 (shown in FIG. 16), of the cutting edge 626 of an implement 628 coupled to the front of the power machine. Camera 622 can be mounted on brow 621 of cab top 620, or in any suitable position, and oriented toward cutting edge 626. When looking at the cutting edge 626 without such a system, operators conventionally have been required to look generally downward toward the cutting-edge of an implement. Thus, the low position of display 602 in cab 650 with a cutting-edge viewing system provides an improved cutting-edge view, while allowing the operator to look generally in the conventional direction for observing the cutting edge.

While camera 622 is illustrated with reference to cab 650 and display position 602, camera 622 can be used with any cab and any display position to provide a video feed of a view of cutting edge 626 of implement 628. Further, it is not required that the display providing the cutting-edge view to the operator be dedicated for only this purpose. Instead, the display can be multi-purpose and can change the displayed information either automatically, or in response to an input from the operator. As mentioned above, in some embodiments, the display can be configured to change the displayed information to automatically provide the cutting-edge view when the display is rotated from a portrait orientation to a landscape orientation.

The discussion above provides several important advantages. Included is the ability to mount a display in various locations within an operator compartment to accommodate a door that opens to an overhead position. In the various embodiments, the display is positioned in locations that allow freedom of movement of such a door while also providing convenient locations for an operator to view the display, irrespective of the position of the door.

Although the present invention has been described with reference to preferred embodiments, workers skilled in the art will recognize that changes may be made in form and detail without departing from the scope of the discussion.

What is claimed is:

1. A cab for a power machine, the cab comprising:
   a cab frame forming an operator compartment and having a first side wall, a second sidewall, a front side, a rear side, and a top;
   an operator seat positioned within the operator compartment;
   a cab door configured to cover an opening in the front of the cab frame when in a closed position and be moveable between the closed position and an open position above the operator seat;
   a camera providing a video feed;
   a display mounted to a pillar of the cab frame in a corner between the front and one of the first and second sidewalls at a position interior to the cab, the display positioned in the corner so as to provide visual access to the display by an operator positioned on the operator seat with the cab door in the closed position, the open position overhead of the operator seat, and in a transition position between the open and closed positions;
   a display mount mounting the display to the pillar and configured to allow the display to be rotated between a portrait display position and a landscape display position;
   wherein the display is configured to automatically switch, in response to the display being rotated between the portrait and landscape display positions, between displaying operational information when in the portrait display position and displaying the video feed from the camera when in the landscape display position.

2. The cab of claim 1, and further comprising a linkage coupled to the cab frame and to the cab door and configured to define a path of movement for and support the cab door as the cab door moves between the closed position and the open position overhead of the operator seat.

3. The cab of claim 2, wherein the display is positioned such that neither the cab door nor any links of the linkage obstruct the operator's view of the display as the cab door moves between the closed position and the open position overhead of the operator seat.

4. The cab of claim 3, wherein the linkage is a four-bar linkage.

5. The cab of claim 3, wherein in the open position, the cab door is positioned beneath the top of the cab frame.

6. The cab of claim 2, wherein the operator seat is configured to slide forward and backward, and the cab further comprising a joystick controller positioned forward of the operator seat, wherein the display is mounted to the pillar at a position such that, with the operator seat moved to its forward most position and with the joystick controller raised to its highest position, the display remains a distance above the joystick controller.

7. The cab of claim 6, wherein the distance is at least six inches.

8. The cab of claim 1, wherein the video feed from the camera is a video feed of at least a front edge of a tool attached to the power machine.

9. A cab for a power machine, the cab comprising:
   a cab frame forming an operator compartment;
   a camera providing a video feed;
   a display positioned within the operator compartment of the cab, the display having a display mount configured to allow the display to be rotated between a portrait display position and a landscape display position;
   wherein the display is configured to automatically switch, in response to the display being rotated between the portrait and landscape display positions, between displaying operational information when in the portrait display position and displaying the video feed from the camera when in the landscape display position.

10. The cab of claim 9, wherein the video feed from the camera is a video feed of at least a front edge of a tool attached to the power machine.

\* \* \* \* \*